United States Patent [19]

Knowlton

[11] 4,222,076
[45] Sep. 9, 1980

[54] PROGRESSIVE IMAGE TRANSMISSION

[75] Inventor: Kenneth C. Knowlton, Plainfield, N.J.

[73] Assignee: Bell Telephone Laboratories, Incorporated, Murray Hill, N.J.

[21] Appl. No.: 942,599

[22] Filed: Sep. 15, 1978

[51] Int. Cl.² .......................... H04N 1/00; G01T 1/29
[52] U.S. Cl. .................................... 358/263; 358/260; 358/133; 364/515
[58] Field of Search ............... 358/260, 261, 263, 133; 340/345, 146.3 R; 364/515

[56] References Cited

U.S. PATENT DOCUMENTS 3,609,670  9/1971  Knowlton ........................... 364/300

OTHER PUBLICATIONS

D. H. Hamsher, "Facsimile" *Comm. Systems Eng. Handbook*, 1967, pp. 2–67.
S. Tanimoto et al., "A Hierarchical Data Structure for Picture Processing", Comp. Graphics and Image Processing.

*Primary Examiner*—Robert L. Griffin
*Assistant Examiner*—Edward L. Coles

*Attorney, Agent, or Firm*—Joseph P. Kearns

[57] ABSTRACT

A gray-scale image is progressively transmitted over a narrow-band channel after the gray-scale values of all picture elements (pixels) have been formatted into a hierarchical structure of picture subdivisions of successive sizes from entire image down to basic element values. Each formatted value is encoded as an approximate average of paired values. Transmission involves sending the primary value, representing the overall gray-scale magnitude, and following with successively split image values so that the entire image can be reconstructed at a receiver in progressively finer detail until the ultimate image results. The coding is nonredundant and full reconstruction is accomplished by transmitting the same number of bits that are required to send the image pixel-by-pixel and line-by-line with the difference that an intermediate version can supply enough image detail for recognition. Unwanted images can be aborted at any intermediate stage, thus saving overall transmission time and effecting an equivalent picture compression when many images need to be examined in rapid succession.

13 Claims, 8 Drawing Figures

NOTE: NUMBERS IN RECTANGLES ARE INDEXED TO FIG. 4

PROGRESSIVE IMAGE TRANSMISSION

FIELD OF THE INVENTION

This invention relates to the transmission of pictorial images over narrow-band transmission channels in general and, in particular, to two-dimensional gray-scale encoding of picture elements to facilitate the transmission of progressively better approximations of ultimate image details.

BACKGROUND OF THE INVENTION

Two-dimensional picture images in black and white, or more precisely in various shades of gray, are conventionally prepared for transmission over channels of restricted bandwidth by means of raster scanning. In raster scanning a moving beam of electrons or spot of light travels over the image mounted on a drum or flat-bed scanner in a regular pattern of lines sweeping from the top of a frame to the bottom. Typically, for a slow-scan analog facsimile system, such as is afforded by the use of the Western Electric Data Set Type 602A, a transmission time of about six minutes is required to send over the switched telephone network a sketch, order or message of an 8½ by 11-inch letterhead size with a definition of 96 lines per inch at a speed of 180 lines per minute.

A digital system providing the same resolution for the approximate 7½ by 10-inch sight area with an aspect ratio of three-to-four contains about 720 picture elements (pixels) per line and 960 lines per sheet for a total of 691,200 pixels. If there are sixteen possible gray levels assignable to each pixel, then four bits are required to transmit each pixel for a total of 2,764,800 bits. A Western Electric Data Set Type 208B operating at 4800 bits per second in the voice-frequency band of the switched telephone network thus requires 9.6 minutes to transmit an image which is the size of a business letterhead. What the digital system lacks in speed of transmission relative to an analog system is made up in reliability and adaptability to processing.

Analog facsimile scanning systems are well known in the art and may be found described in Chapter 2 starting at page 2–67 in *Communication Systems Engineering Handbook* edited by D. H. Hamsher (McGraw-Hill Book Company, New York 1967). Digital systems are disclosed in *Digital Picture Processing* by A. Rosenfeld and A. C. Kak, published by Academic Press in 1976.

It is straightforward to encode the gray-scale values of individual pixels as binary numbers to as many as 6, 8 or 10 digits as desired. An eight-bit number encodes, for example, 256 gray-scale levels, i.e., the digit two raised to the eighth power. Conversion of gray-scale values to digital numbers facilitates transmission of picture information over pulse-code modulation (PCM) channels.

In line-by-line transmission, whether transmission is by analog or digital means, stationary images are scanned as a sequence of rows, top row first and bottom row last. In order to view the entire image one must wait for substantially complete transmission. However, if the image information is reorganized at the transmitter terminal by means of high-speed apparatus, the low-speed transmission can furnish the gross structure of the entire image soon after the beginning of transmission and add increasingly detailed refinements as transmission proceeds.

In a paper entitled "A Hierarchical Data Structure for Picture Processing" published in *Computer Graphics and Image Processing* (Vol. 4, No. 2, pp. 104–119, June 1975) S. Tanimoto and T. Pavlidis have proposed for pattern recognition and data compaction purposes to process the digital representations of the pixels of highest resolution into progressively coarser levels of spatial resolution. The lower-resolution levels are coded by fewer bits of data and hence can be transmitted much faster than the final image. Picture analysis is said to be made more efficient by this type of image processing. The authors base their hierarchical structure on four-cell true averages.

Important applications of the hierarchical arrangement for image-processing data includes rapid remote browsing through a sequence of images. The recipient is thereby permitted to abort transmission of unwanted images as soon as they are recognizable, far short of complete transmission. Another application is teleconferencing by way of telephone lines where visual material, such as sketches and graphs, can be sent over auxiliary facsimile apparatus by presenting rough representations first and detail later. Other potential applications include interactive computer graphics and the sending of a picture from a transmitter threatened with imminent destruction, as in a fire or with seismographic alarm apparatus, where one hopes for the best possible picture in whatever time remains for transmission.

SUMMARY OF THE INVENTION

According to this invention, a pyramid of image subdivisions of successive sizes is constructed by assigning approximate average gray-scale values to all pairs of cells from the elemental pixels to one encompassing the entire image. The cells at pyramidal nodes are hierarchically arranged such that the primary value at the apex of the pyramid stands for the approximate average gray-scale value of the entire image and the cells at the base are the gray-scale values of the elemental pixels. The cells at intermediate levels of the pyramid are occupied by the approximate average gray-scale values of successively smaller subareas of the image. Viewing the successive images yields a progressively more detailed representation of the complete image. In order to avoid generating longer and longer numbers as successive exact averages of paired gray-scale values are taken, and to avoid truncating such averages, a two coordinate coding is proposed which uses the same number of bits for each approximate average as there is in each value averaged. Under this proposal the entire image can be transmitted progressively in exactly the same number of bits as is required for line-by-line transmission.

In order to construct the hierarchical arrangement, the entire image must first be raster scanned to obtain the gray-scale value of each elemental pixel. These values are then stored in a gray-scale random-access memory (RAM). Thereafter, the stored values are processed to form a tree of hierarchical approximate representations of successive pairs of gray-scale values. When low-speed transmission is desired over a narrow-band channel, the processed values can be read out level by level until the displayed image is aborted or completed. Since the coordinates for each hierarchical node are of equal length, the incremental transmission time for each successive level is double that of its predecessor. Thus, the sooner the received image is recognized as other than that being sought, the lesser is the transmission time expended.

At the receiver terminal the gray levels are reprocessed in an inverse manner using a frame buffer to excite the proper cells in the display unit.

BRIEF DESCRIPTION OF THE DRAWINGS

A better understanding of this invention may be gained from a consideration of the following detailed description, presented by way of example, with reference to the accompanying drawings, in which.

DETAILED DESCRIPTION

Figure 1:
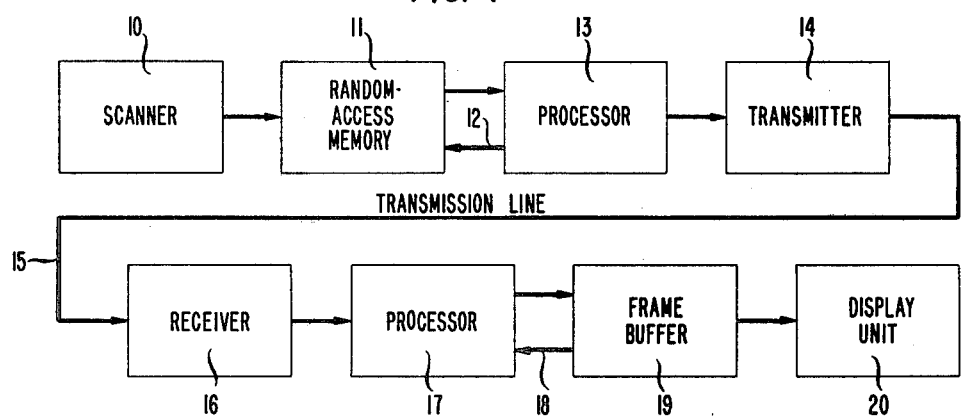
FIG. 1 is a block diagram of a representative graphics display transmission system.

FIG. 1 is a block diagram of an image scanning and transmission system according to this invention which comprises scanner 10, random-access memory (RAM) 11, processor 13 for scanned information, a transmitter 14, transmission line 15, receiver 16, processor 17 for received picture information, frame buffer 19 and video display unit 20.

Scanner 10 provides a scanning spot, by way of example, which moves line-by-line in a horizontal direction during a downward sweep. Element-by-element on each horizontal line gray-scale values are stored digital fashion in gray-scale random-access memory 11. Gray-scale values can be stored either sequentially in memory 11 or in preprogrammed locations which facilitate progressive image transmission.

It is to be understood that in principle color information can be obtained in an analogous manner using three simultaneous beams with appropriate filters and three separate memories or with an expanded single memory.

Gray-scale values are stored as digital numbers such that, for example, a four-bit number can represent 16 discrete light intensities from all white to all black. Processor 13 operates on the stored cell-by-cell gray-scale values to form a hierarchical array of "composite average values" and "differentiators" according to the principle of this invention, as explained more fully hereinafter. The processed values are also stored in RAM 11, to which interactive access is provided with processor 13 over lead 12. The events occurring in blocks 10 through 13 take place at normally rapid scanning and computing speeds.

If a wideband channel were available, as in television broadcasting, there would be no need for processing the scanned information and such information could be transmitted as rapidly as it is generated. However, where the channel available has only voiceband capabilities, for example, image information can be transmitted at very slow rates measured in only thousands of bits per second rather than millions. Accordingly, the processed data in RAM 11 is fitted to the transmission characteristics of transmission line 15, whether by amplitude, frequency, phase or time modulation, in transmitter 14.

At receiver 16 the modulated digits encoding the image information being transmitted are restored to baseband by appropriate conventional means. Processor 17 then operates on the restored bits to reconstruct a beam intensity pattern for display unit 20 through the medium of frame buffer 19. Effectively frame buffer 19, to which interactive access to processor 17 is provided over lead 18, furnishes timing and deflection control to display unit 20 in a conventional manner. By working down from the top of the hierarchical array of composite averages and differentiators, as defined hereinafter, transmitted from processor 13, the desired image is reconstructed in gross form first—an overall gray level——and then successively in halves, quarters and smaller subdivisions until each picture element is revealed in its correct gray-scale value.

The scheme proposed is much less complex than analyzing the image to be transmitted into its Fourier transform coefficients for the purpose of achieving gross image structure by transmitting first the coefficients of the lowest-frequency components and following with higher and higher frequency coefficients. The Fourier transform method is described in Chapter 2 of the aforementioned *Digital Picture Processing* book.

A hierarchical system for picture subdivision in binary fashion is proposed. Successive levels of subdivision are achieved, as diagrammed in FIG. 2, by splitting the overall picture first into top and bottom halves; and next, into left and right halves. Subsequently, left and right halves are themselves further split into top and bottom segments alternately with side-by-side segments, which are split into more, but smaller, top and bottom segments. The numbers 1 through 8 on the drawing indicate the splitting progression for a part of the image. The splitting of the remainder of the image proceeds simultaneously. This subdivision process is continued down to pixel size.

The proposed binary splitting scheme can be contrasted with the Tanimoto-Pavlidis four-way split in which the original image is first split into four parts of equal size and subsequently each of the four parts is further split into four more smaller parts of equal size until the ultimate resolution is achieved. The propsed scheme has been found to require smaller tables to encode the successive splittings and to yield successive approximations more frequently.

Figure 2:
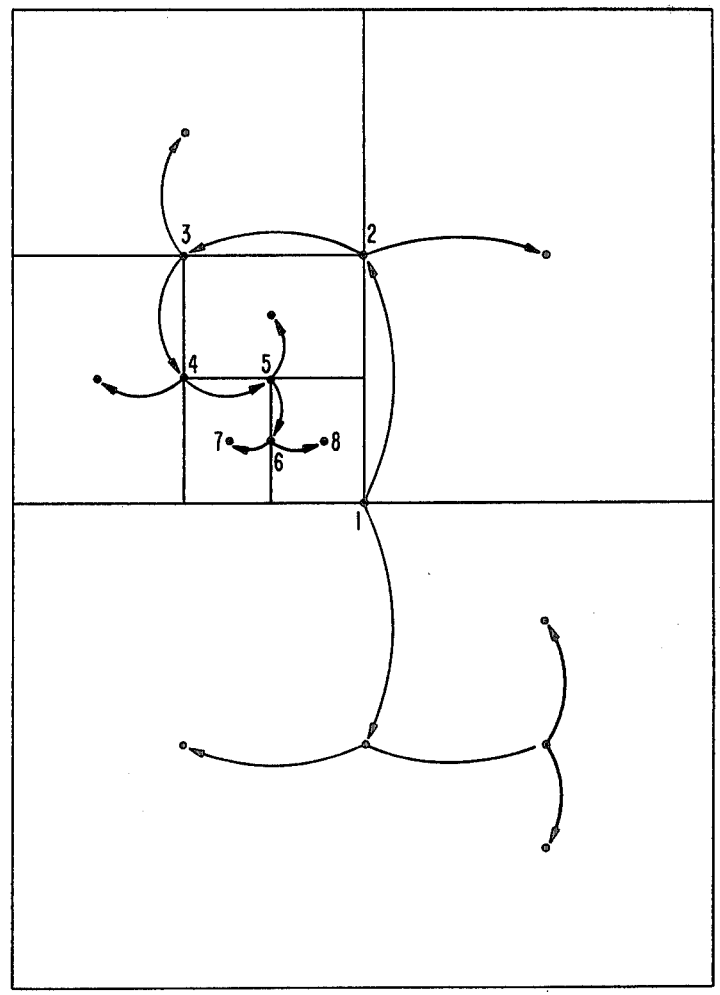
FIG. 2 is a diagram illustrating successive subdivision of an image to facilitate progressive transmission thereof.

The scheme of FIG. 2 can be visualized as successive approximations of the ultimate image consisting, for illustrative purposes of 256 lines with 128 cells for each line quantized into sixteen discrete gray levels. The zero-th approximation is a single full-screen monotone area. The first approximation comprises two rectangles, an upper and a lower. Subsequent approximations comprise successive doublings of rectangles, each approximation containing $2^n$ rectangles, where n is the order of the approximation, until an upper limit, such as the fifteenth power of two yieldings 32,768 pixels, is reached. Where the overall image has a 4 to 3 height-to-width aspect ratio, successive approximations alternate between aspect ratios of 2 to 3 and 4 to 3, as is apparent in FIG. 2.

In order to form a code for progressive image transmission it is necessary to work backwards from individual pixels in what is effectively the fifteenth detailed approximation to the zero-th monotone. Consider the gray levels of adjacent cells determined in the rapid scanning process. These levels are represented by binary numbers. If a true average of numbers identifying adjacent gray values is taken, it is found that a larger number of bits is required than for each of the original numbers because fractions are generated. These extra digits represent overhead which causes progressive transmission time to exceed unprocessed transmission time. To avoid this overhead a composite value $V_c$ near the average of two adjacent values, but nevertheless an integer, is chosen followed by a differentiator d, which indicates effectively how the available light is distributed between the two pixels being averaged.

Figure 3:
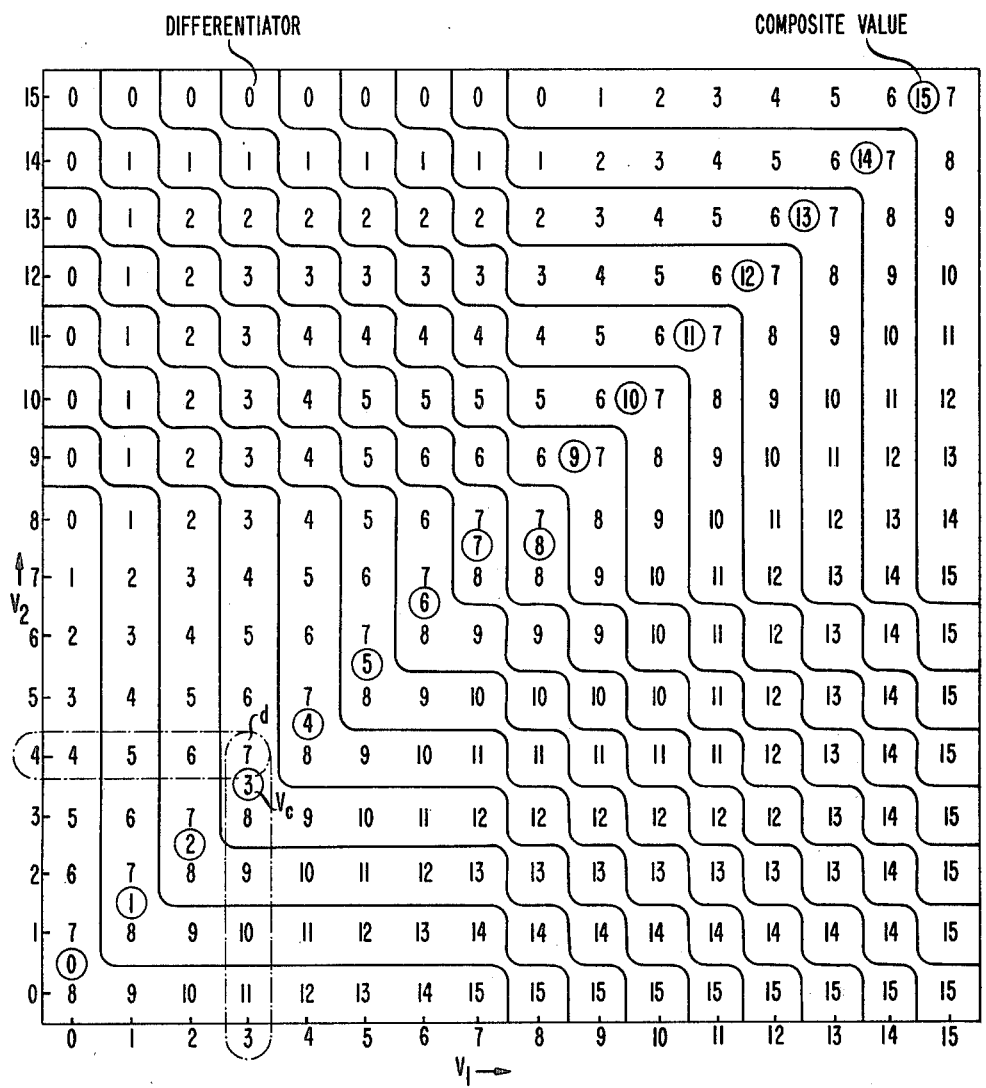
FIG. 3 is a diagram of a scheme for encoding picture elements of an image to be transmitted into integer composite and difference coordinates.

FIG. 3 diagrams a composite averaging scheme which avoids redundancy, as well as truncation and roundoff errors. All possible 256 combinations of two gray-level values are charted in sixteen segments of equal size in such a way that $V_1/V_2$ intersections in successive segments numbered from 0 to 15 correspond roughly to increasingly larger average values. The segments are constructed by first placing a unit width strip 0 with sixteen unit areas in the lower left corner and adding on further unit width strips paralleling the first until the whole chart is filled. The strips represent increasingly darker values from white in strip 0 to black in strip 15. The encircled numbers assigned to the strips correspond with composite, i.e., near average, values. Each strip in turn has each of 16 unit areas also numbered from 0 to 15. The latter numbers are the differentiators d which serve to disambiguate or differentiate among the value pairs that have the same composite value. As shown in FIG. 3 by dotted lines defining the intersection of a $V_1$ value of 3 and a $V_2$ value of 4, the composite value $V_c$ becomes 3 because the intersection falls in strip 3 and the differentiator d becomes 7, i.e., the intersection is seen to fall in the seventh unit area of strip 3. Since the highest values of $V_c$ and d are 15, four-bit numbers suffice to represent them. Therefore, an eight-bit number can completely represent the two values together. The 256 correspondences between $V_1$ and $V_2$ values on the one hand and $V_c$ and d values on the other hand can be determined from the diagram of FIG. 3 and stored in RAM 11, as shown in FIG. 1, for look-up purposes.

The values determined from the diagram of FIG. 3 are identically stored at the display location in frame buffer 19.

It may be noted from FIG. 3 that the composite values corresponding to equal $V_1$ and $V_2$ values fall on the left-to-right upward diagonal and are these same values. It can further be shown that the digit-conserving composite values are never farther than 4 out of 16 gray-scale levels away from the true average, and this only in low-probability cases where one of the values is either a 0 or 15 and the other value is at midrange.

Figure 4:
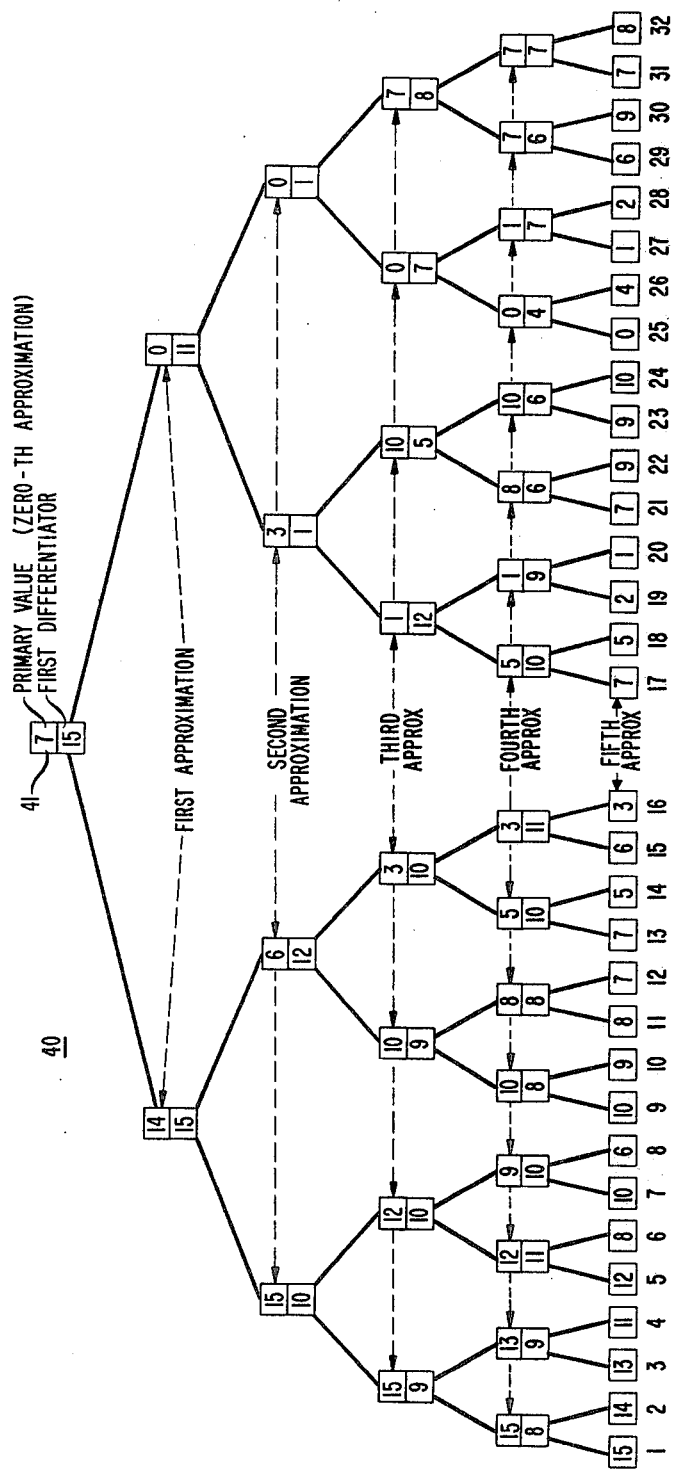
FIG. 4 is a binary tree representation of the hierarchical structure of encoded gray-scale values.

FIG. 4 is a diagram of the hierarchical structure or tree of composite values $V_c$ and differentiators d into which the pixels of the final picture are processed. A simple image containing only thirty-two pixels is shown for discussion purposes. Four levels of approximation are shown for this rectangular image four pixels across by eight lines high. Each elemental pixel is also rectangular. The processing proceeds from the sequence of gray-scale values of the elementary pixels in the final image as obtained by the scanning device. In the explanatory example of FIG. 4 the 32-pixel final image is five approximations from the initially transmitted monotone image.

A practical system capable of handling an image containing 32,768 pixels, as previously suggested, requires fifteen approximations for full image development.

The fourth approximation is realized from the true image as follows: for each pair of pixels a composite value and its corresponding differentiator are selected from the chart of FIG. 3 or by lock-up in its equivalent RAM to complete a node. If the final image is defined by the gray-scale values of $2^5$ pixels, there are $2^4$, i.e., $2^{n-1}$ nodes in the (n-1)th approximation. The next coarser or third approximation is in turn generated by forming new nodes between pairs of adjacent composite values of the previous fourth approximation and further determining their differentiator values. The processing of composite values and differentiators continues to the top of the binary tree corresponding to the hierarchy of image subdivisions by coalescing pairs of composite values of each lower order into the next higher order. The culmination of the zero-th approximation comprises a single primary value and its first differentiator. This primary value is the approximate gray-scale value of an overall monotone image.

There are several schemes by which the tree of FIG. 4 can be built up. The principle can be illustrated concretely by considering a rectangular image with thirty-two pixels to be scanned, as shown in block 56 of FIG. 5. Each pixel in block 56 is numbered in a pattern dividing the image into four quadrants. Each quadrant is uniformly numbered vertically in respective left and right halves. These pixel numbers appear at the base of the pyramid in FIG. 4. Whether the scanning proceeds line by line and from left to right or in the numerical sequence shown, the stored grey-level values are accessed in accordance with the tree of FIG. 4.

One scheme processes all values level by level. In this scheme the values of the thirty-two pixels on the bottom level are combined in pairs composing a left-hand odd-numbered cell and its right-hand even-numbered companion to form the node directly above, including a differentiator d and a composite value v found in a look-up table encoding the diagram of FIG. 3. Thus, the left-hand node on the fourth-approximation level is formed from cells 1 and 2 (coded as gray levels 15 and 14) by looking up values 15 and 8 for $V_{1-2}$ and $d_{1-2}$. The right-hand node is similarly formed from cells 31 and 32. Intermediate nodes are further formed in an analogous manner to complete the third-approximation level containing eight nodes. The second-approximation level is formed into four nodes by pairing the composite values of the third-approximation level. After completion of the two nodes of the first-approximation level the first differentiator and primary value on the zero-th level are formed in an analogous fashion.

A second scheme proceeds in a zigzag fashion by processing successively only those lower-level values needed to move to the next higher level. Thus, the values of cells 1 and 2 (coded as graylevels 15 and 14) are combined, followed by those of cells 3 and 4 (coded as 13 and 11) to form the two leftmost nodes of the fourth-approximation level with respective composite values 15 and 13 and differentiators 8 and 9. Then instead of going on with the remaining cells on the lowest level, the last-mentioned nodes are combined to form a node on the left of the third-approximation level. Treating cells 5, 6, 7 and 8 yields the next two nodes on the fourth level, and thus permits determination of the next node on the third level. The latter node, together with the third-level node previously determined, permits the formation of the first node on the second level. Cells 9–16 are similarly processed to allow a first-level node to be formed. The right half can now be processed in a similar fashion until its first-level node is found. Finally, the primary node 41 is generated.

With either scheme all intermediate values are stored for further use.

Figure 5:
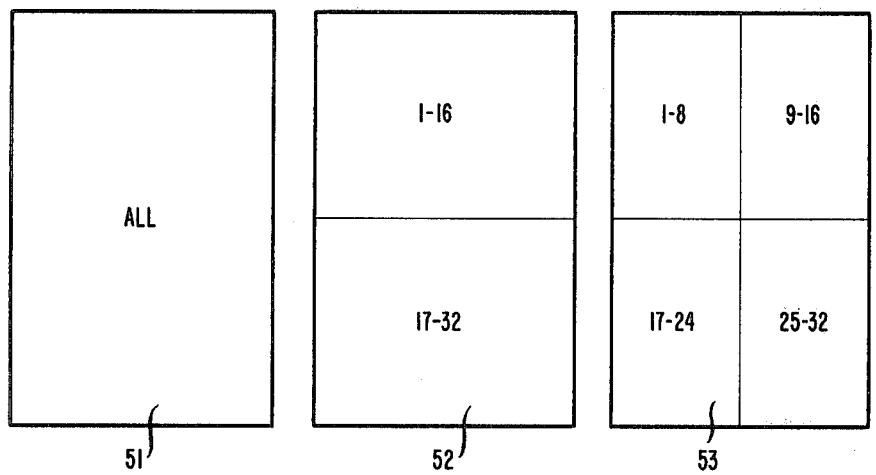
FIG. 5 represents a simplified sequence of progressive images indexed by processing order and useful in explaining the concept of this invention.
Figure 5:
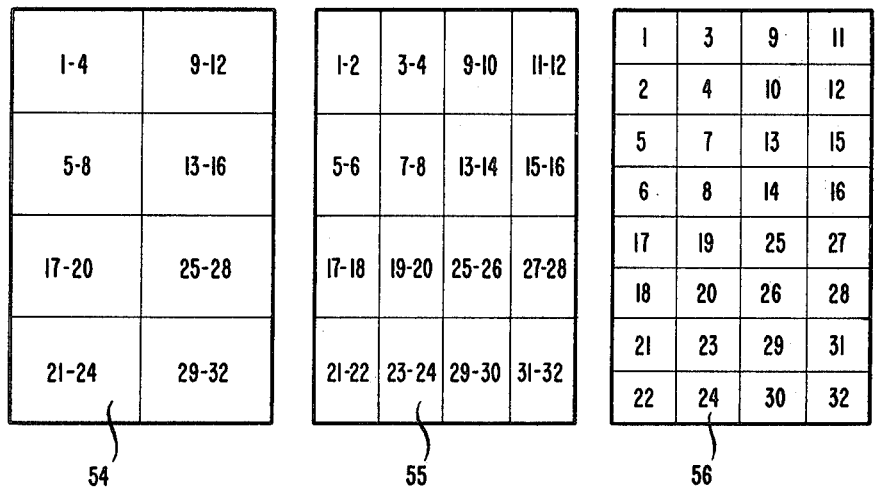

FIG. 5 illustrates the progression of images obtained from the pyramid of FIG. 4 indexed by pixel numbers. Image 51 is the monotone composite average of all pixels, or the zero-th approximation. Image 52 appears as top and bottom halves of the ultimate image averaging pixels 1–16 and 17–32, respectively. The further splittings are represented by images 53 through 56. Image 56 is the highest-resolution original image.

Figure 6:
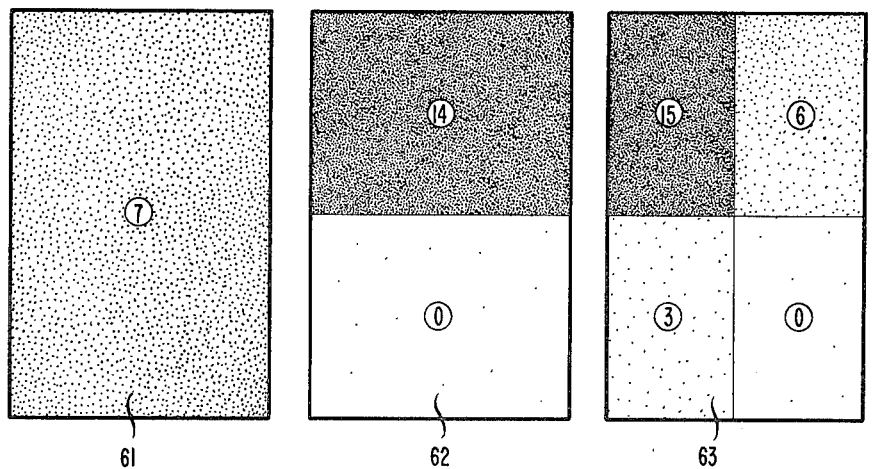
FIG. 6 represents a simplified sequence of progressive images with arbitrary gray-scale values assigned to the ultimate image.
Figure 6:
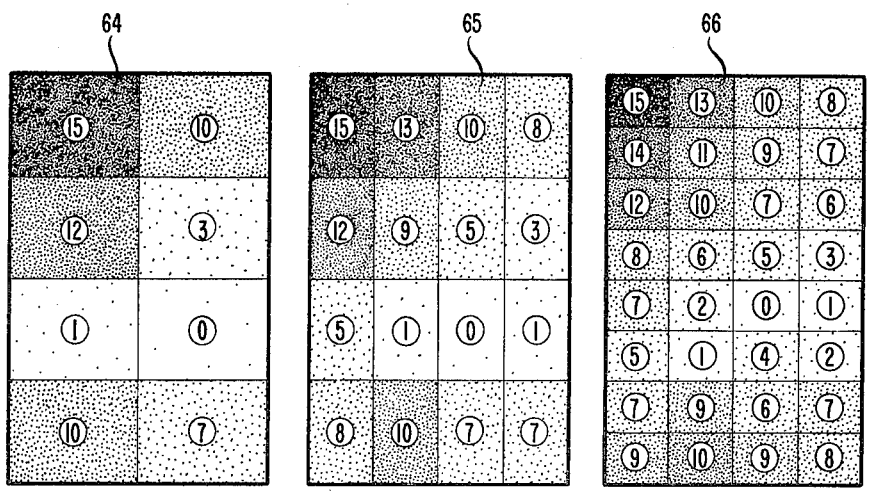

FIG. 6 illustrates the same progression of images as that shown in FIG. 5 but indexed and shaded by gray-scale values. These gray-scale values are the same as those entered in the cells and nodes of the pyramid of FIG. 4. The original image varies in shade from black (level 15) in the upper left-hand corner to white (level 0) near the center. If FIGS. 5 and 6 are superposed, the cells contributing each composite value can readily be seen. The corresponding composite and differentiator values shown in the nodes of FIG. 4 can also be seen to have been derived from the conversion chart of FIG. 3.

After processing of pixel values has been completed, transmission begins. The order of transmission encompasses the primary value contained in the upper half of node 41 followed by the first differentiator contained in the lower half of node 41. Next in order are the differentiators shown in the lower halves of each node level by level.

At the receiver the RAM values are demodulated into digital form in block 16 of FIG. 1 prior to processing in image processor 17. When the primary value is received and demodulated, processor 17 applies this value to frame buffer 19 which in turn furnishes conventional timing, deflection and intensity information for a full frame period to generate a monotone image, as shown in block 61 of FIG. 6. The primary value, containing only four bits, can arrive over a 4800-baud voice telephone channel in less than one millisecond. Display unit 18 can typically generate an image in 1/60 second.

The transmission of the first differentiator d, another four-bit number, can occur in another millisecond. The information contained in the primary value and its associated differentiator, a total of eight bits, is sufficient to look up the composite values defining the light levels of the top and bottom halves of the first approximation, as shown in block 62 of FIG. 6. These composite values combined with the next two differentiators, encoded in another eight bits taking less than two milliseconds to transmit, generate the second approximation comprising the four rectangles shown in block 63 of FIG. 6. These rectangles are in turn split laterally upon the transmission and reception of the four differentiators of the second level as shown in block 64 of FIG. 6.

Transmission of further differentiators continues to define shadings for smaller and smaller rectangles. Block 65 of FIG. 6 shows a sixteen-cell image constituting the fourth approximation and block 66 shows the final, fifth-approximation image.

Figure 7:
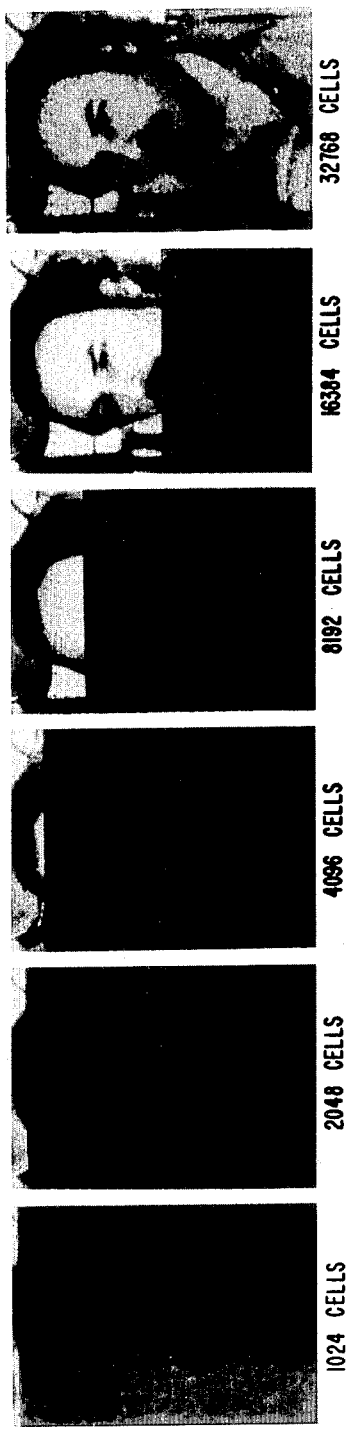
FIG. 7 shows six stages of the development of a complete image by a conventional line-by-line raster scanning method.
Figure 8:
FIG. 8 shows six stages of the development of the image of FIG. 6 by the progressive method according to this invention.

FIGS. 7 and 8 compare portrait images transmitted directly line by line and progressively according to a fifteen-level tree similar in principle to the tree of FIG. 4. A tenth approximation, containing 1024 cells and transmittable as 4096 bits in less than one second, provides the image shown at the left in FIG. 8. This image is recognizable as the head of a bearded man. This is one thirty-second of the total image detail available. This can be compared with the corresponding left image shown in FIG. 7 as the top thirty-second strip of the complete image resulting from a line-by-line scan of the same elapsed transmission time. This fraction of the image is clearly not recognizable. The elapsed times for the other images shown in FIG. 8 for the remaining eleventh through fifteenth approximations are, respectively, approximately 2, 4, 8, 16 and 32 seconds. It is thus clear that each approximate picture of the sequence in FIG. 8 takes twice as long to transmit and process as the previous one.

With regard to the number of bits needed to transmit the entire image, the thirty-two pixel image of FIG. 6 requires the transmission of 128 bits on a line-by-line basis. On a progressive basis there are four bits for each of the primary value and first differentiator. Only thirty differentiators at four bits each remain to be sent. The same total of 128 is obtained. It is apparent that progressive image transmission according to this invention is nonredundant.

Once the image has been analyzed into a primary value and a tree of differentiators, there exist a variety of ways that the picture can be transmitted and reconstructed. Rather than uniformly splitting all cells of one level of approximation to yield the next, it can be arranged that a particular image area be given favored treatment in order to have its detail revealed sooner, for example. The sender may wish to call attention to a particular feature or to send central data ahead of peripheral data.

Non-uniform development of the binary tree can be achieved (1) by having the coordinates of the favored area known in advance by both sender and receiver, (2) by employing the same splitting algorithm at transmitter and receiver, and (3) by having the algorithm correspond to a development of the tree from existing nodes.

The entire hierarchical tree structure can be computed and stored in an array of integrated-circuit (IC) chips.

While this invention has been described in terms of a specific illustrative embodiment, those skilled in the art will appreciate that many modifications are possible within the spirit and scope of the appended claims.

I claim:

1. An image transmission system (FIG. 1) including a scanning device (10), an addressable memory (11) for gray-scale light-intensity values corresponding to each picture element of an image to be transmitted, a transmission channel (15) for such image and an image display device (20) at the opposite terminal of such channel CHARACTERIZED IN THAT numerical gray-scale values of discrete picture elements obtained in such scanning device (10) are taken from said addressable memory (11) in successive pairs and transformed by interaction with the contents of said addressable memory in a processor (13) into a hierarchical array of integral values according to their approximate averages from individual-element pairs to the entire image, integral values are transmitted from said addressable memory (11) in words of uniform length level-by-level of the hierarchical array from the topmost level downward to elemental level over said channel, (15) and the transmitted image is progressively reconstructed (16, 17, 18 and 19) in successively finer detail in said image display device (20) at the opposite terminal of said channel adaptably to having transmission stopped at any hierarchical level up to the transmission of final detail.

2. The image transmission system defined in claim 1 further CHARACTERIZED IN THAT said addressable memory (11) is a random-access memory, and said processor (13) performs arithmetic and control address operations on digital words stored in said memory.

3. The image transmission system defined in claim 1 further CHARACTERIZED IN THAT said transmission channel (15) includes transmitter (14) and receiver apparatus (16) for translating between the passband characteristics of said channel and the baseband characteristics of the respective transmitting and receiving terminals.

4. The image transmission system defined in claim 1 further CHARACTERIZED IN THAT the receiving apparatus at the opposite terminal of said channel includes a frame buffer (19) for controlling the beam intensity characteristics of said display device (20) in accordance with received data words.

5. The image transmission system defined in claim 1 further CHARACTERIZED IN THAT each successive pair of numerical gray-scale values from said scanning device (10) is transformed by said processor (13) into a first composite integer value having the same number of bits as an original gray-scale value and approximating the average of the pair of gray-scale values and into a second differentiator value of the same number of bits indicating the identity of the original individual values from which the associated composite value was formed, and the correspondence of each possible pair of gray-scale values to a respective composite and differentiator value is programmed into said addressable memory (11).

6. The image transmission system defined in claim 5 further CHARACTERIZED IN THAT pairs of composite values obtained from pairs of original gray-scale values are further processed into higher levels of combined composite and differentiator values to form additional levels of said hierarchical array until a single primary composite value and corresponding first differentiator value are obtained and stored in said memory (11).

7. The image transmission system defined in claim 1 CHARACTERIZED IN THAT the progressive reconstruction of the transmitted image is accomplished by converting the received differentiator value into numerical gray-scale values of adjacent picture elements in accordance with a preprogrammed correspondence between each received differentiator value and each possible pair of gray-scale values for adjacent elements.

8. In an image transmission system including a scanning device, an addressable memory for gray-scale light-intensity values corresponding to each picture element of an image to be transmitted, a transmission channel for such image and an image display device at the opposite terminal of such channel, the method of progressively transmitting an image over such system comprising the steps of:

generating numerical gray-scale values of discrete picture elements in such scanning device for storage in said addressable memory, processing said stored gray-scale values in successive pairs interactively with the contents of said storage memory to form a hierarchical array of integral values according to their approximate averages from individual-element pairs to the entire image, transmitting the integral values from said addressable memory in words of uniform length level-by-level of the hierarchical array from the topmost level downward to elemental level over said channel, and reconstructing the transmitted image progressively in successively finer detail in said image display device at the opposite terminal of said channel adaptably to having transmission stopped at any hierarchical level up to the transmission of final detail.

9. The method of progressive image transmission defined in claim 8 further comprising the step of translating in said transmission channel signals representing said integral values between the passband characteristics of said channel and the baseband characteristics of the respective transmitting and receiving terminals.

10. The method or progressive image transmission defined in claim 8 further comprising the step of buffering processed integral image values at the opposite terminal of said channel to said display device to control the deflection characteristics thereof in accordance with received data words.

11. The method of progressive image transmission defined in claim 8 further comprising the steps of transforming each successive pair of numerical gray-scale values from said scanning device into a first composite integer value having the same number of bits as an original gray-scale value and approximating the average of the pair of gray-scale values and into a second differentiator value of the same number of bits indicating the identity of the original individual values from which the associated composite value was formed, and programming the correspondence of each possible pair of gray-scale values to a respective composite and differentiator value into said addressable memory.

12. The method of progressive image transmission defined in claim 11 further comprising the step of processing pairs of composite values obtained from pairs of original gray-scale values into higher levels of combined composite and differentiator values to form additional levels of said hierarchical array until a single primary composite value and corresponding first differentiator value are obtained and stored in said addressable memory.

13. The method of progressive image transmission defined in claim 8 further comprising the step of progressively reconstructing the transmitted image by converting the received differentiator values into numerical gray-scale values of adjacent picture elements in accordance with a preprogrammed correspondence between each received differentiator value and each possible pair of gray-scale values for adjacent elements.

* * * * *